July 24, 1956

H. R. NILSSON ET AL 2,755,990

HOUSING CONSTRUCTION FOR DISPLACEMENT
ENGINES OF SCREW ROTOR TYPE

Filed Aug. 2, 1949

INVENTORS
Hans Robert Nilsson
Åke Walter Sigvard Persson
BY
Jarvis Marble
Their ATTORNEY July 24, 1956  H. R. NILSSON ET AL  2,755,990
HOUSING CONSTRUCTION FOR DISPLACEMENT
ENGINES OF SCREW ROTOR TYPE
Filed Aug. 2, 1949  9 Sheets-Sheet 2

July 24, 1956

H. R. NILSSON ET AL 2,755,990

HOUSING CONSTRUCTION FOR DISPLACEMENT
ENGINES OF SCREW ROTOR TYPE

Filed Aug. 2, 1949

INVENTOR
Hans Robert Nilsson
Per Walter Sigurd Persson
BY
Jarvis C. Marble
Their ATTORNEY

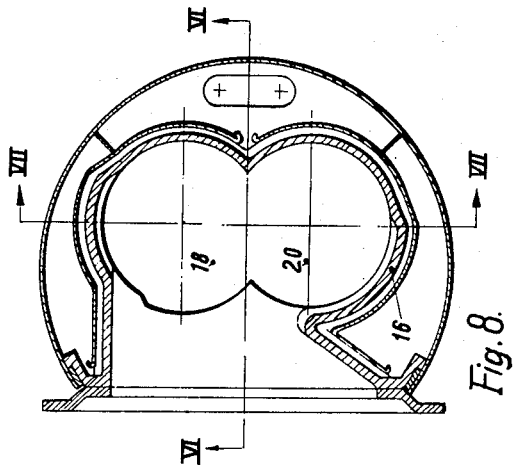
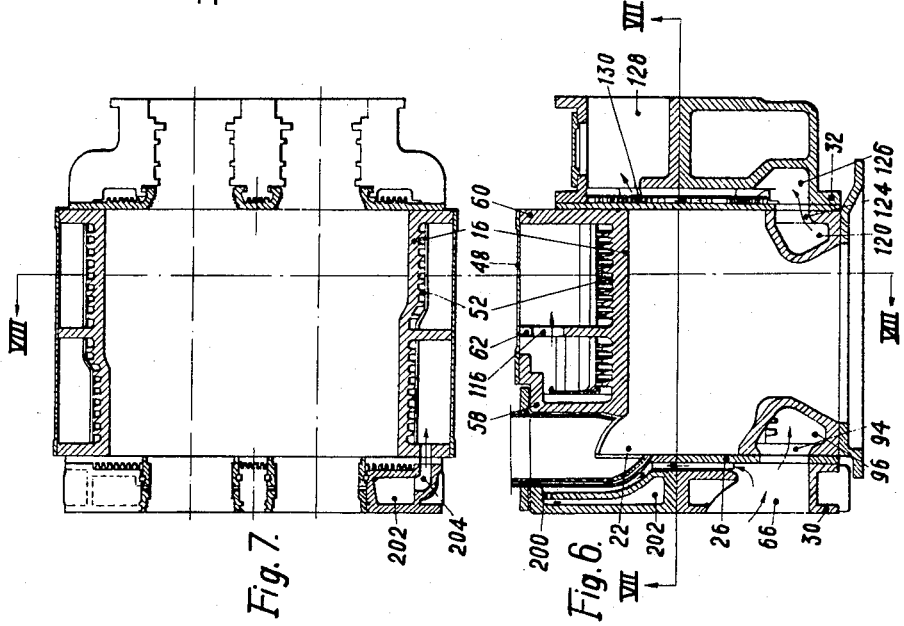

INVENTORS
HANS ROBERT NILSSON
PER WALTHER SIGVARD PERSSON
BY
THEIR ATTORNEY

INVENTORS
HANS ROBERT NILSSON
PER WALTHER SIGVARD PERSSON
BY
THEIR ATTORNEY

# United States Patent Office 2,755,990
Patented July 24, 1956

2,755,990

HOUSING CONSTRUCTION FOR DISPLACEMENT ENGINES OF SCREW ROTOR TYPE

Hans Robert Nilsson and Per Walther Sigvard Persson, Stockholm, Sweden, assignors, by mesne assignments, to Svenska Rotor Maskiner Aktiebolag, Nacka, Sweden, a corporation of Sweden Application August 2, 1949, Serial No. 108,117

Claims priority, application Sweden August 4, 1948

14 Claims. (Cl. 230—143)

As is well known, the so-called displacement engines of screw rotor type which may be used both as compressors and as power generating engines for their main parts consist of two or more mutually co-operating screw-shaped rotors so arranged in bores or grooves in an engine housing that working chambers variable in respect of volume, for the working medium of the engine are formed between the inside wall of the housing on one side and the walls of mutually co-operating screw-shaped rotor cams on the other side. For this purpose the inside wall of the housing must have a contour which with the smallest possible clearance follows the outer contour of the co-operating rotors. Heretofore this relatively complicated contour of the housing therefore has practically made it necessary to produce it through casting, whereby for material-saving purposes also the outer contour of the housing has been made to substantially follow the inner contour, reinforcing flanges at the same time being provided in the wedgeshaped clearances between two rotor grooves. In spite of these material-saving efforts, the cast constructions must be given a relatively large thickness in order to resist with certainty the working pressures in question and other strains, which material thickness must be at least partially increased in those cases where cooling is necessary and the housing structure for this purpose is traversed by cooling ducts. The difficulty, not to say the impossibility of producing sufficiently small wall thicknesses in the hitherto suggested constructions manufactured by casting has made it impossible to produce this engine type as a light weight construction while maintaining the demand for necessary strength.

The main purpose of this invention is to create a new housing construction for engines of the type in question, through which the said deficiencies are avoided. According to the invention, the housing may be built up from a plurality of different parts which may be produced separately of forged or rolled material, for instance sheet, and which are hereby easier to work than the older, cast constructions. In this way the construction may be provided with so thin walls that it is also fit for light weight construction.

Another purpose is to create a housing construction permitting sufficient cooling with a gaseous cooling medium, whas not been possible with the older cast housing constructions.

For the accomplishment of these objects and other advantages to be described more in detail in the following, the housing construction according to the invention is chiefly characterized in that it comprises one inner and one outer mantle or jacket as well as flanges connecting onto end gables, the contour of the inside wall of the inner mantle following the contour of the co-operating rotors and furthermore being provided with reinforcing flanges, the outer edges of which are located on a cylinder surface which substantially or completely encases the inner jacket, while the outer jacket is constituted by a cylinder which is secured to the flanges connecting on to the end gables and rests on the outer edges of the reinforcing flanges.

A series of lower flanges may be provided between the reinforcing flanges supporting the outer jacket, said lower flanges partly serving as further reinforcement for the construction and partly as cooling flanges, which are particularly appropriate when the cooling is carried out with a gaseous cooling medium led through the space between the outer and the inner jacket. According to a special embodiment, guide plates for the cooling medium are placed in the said interspace in order to cause the cooling medium to flow at a higher velocity along the inner jacket, which is to be cooled for the accomplishment of improved heat transmission.

The invention will be described more in detail in the following reference being had to the annexed drawings which by way of examples, but not in a limiting sense disclose some suitable embodiments. The figures shown in section refer to the respective section lines indicated by corresponding numbers in roman figures.

Figs. 6–8 show a modified form of the housing of an engine according to Figs. 1–5.

Figure 9:
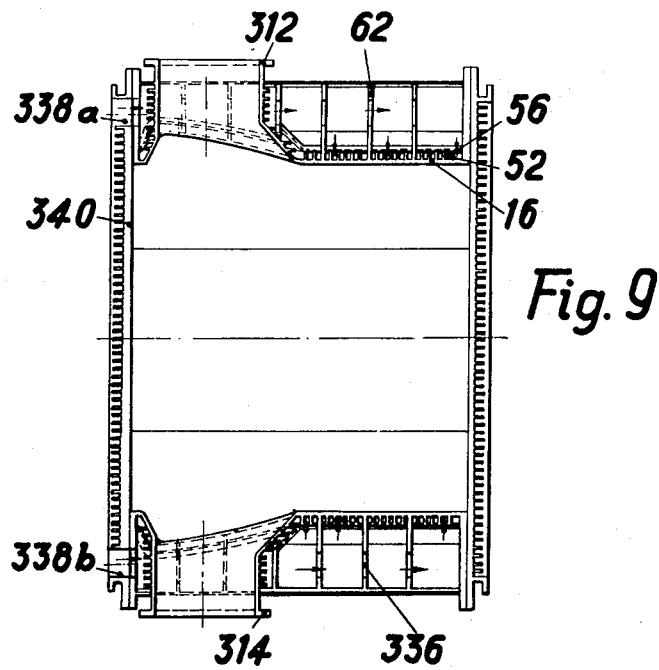
Figure 10:
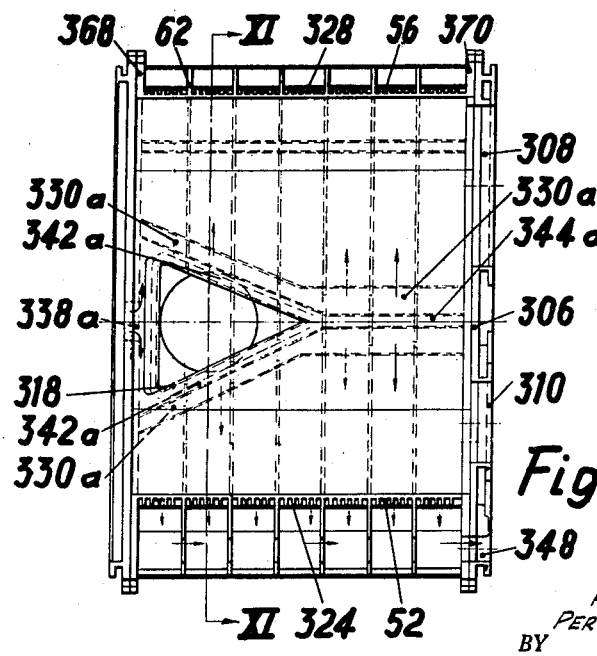
Figure 11:
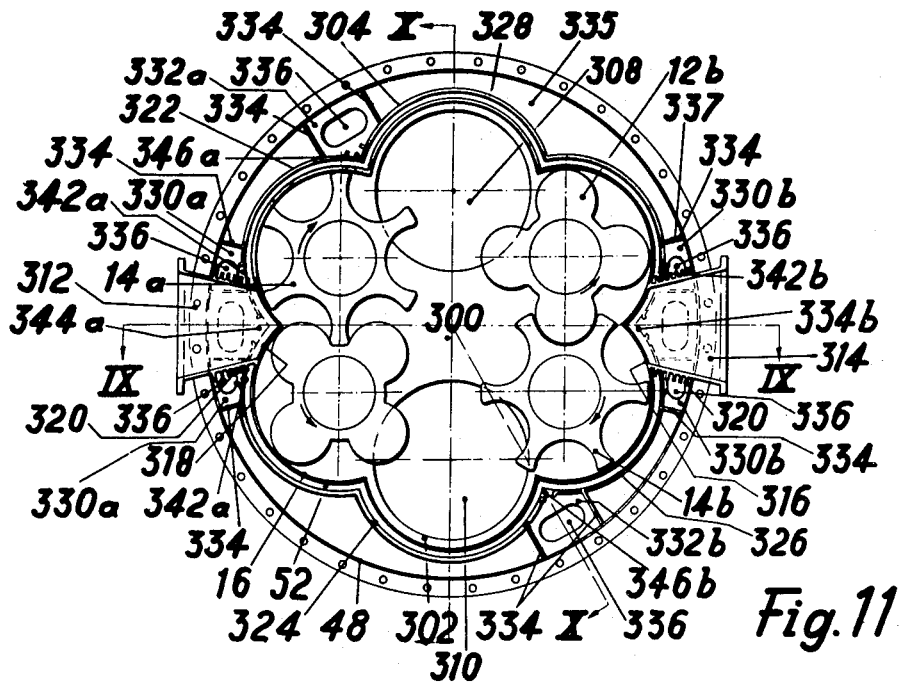

Figs. 9–11 give an example of an expedient embodiment of a built-up housing for two displacement engines.

Figure 12:
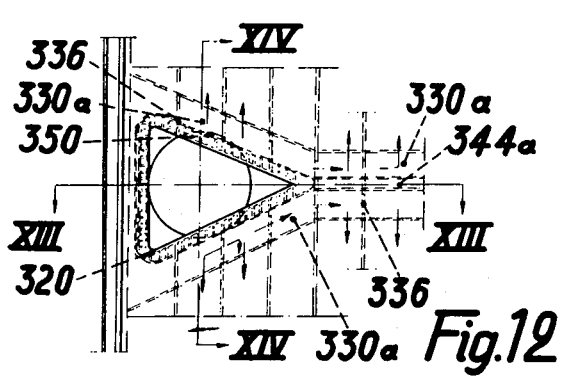
Figure 14:
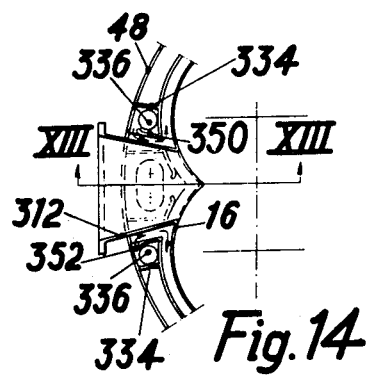
Figure 13:
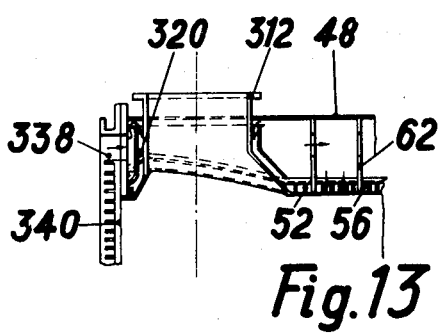

Figs. 12–14 show an alternative embodiment of the inlet part proper to a housing according to the example given in Figs. 9–11.

Figure 15:
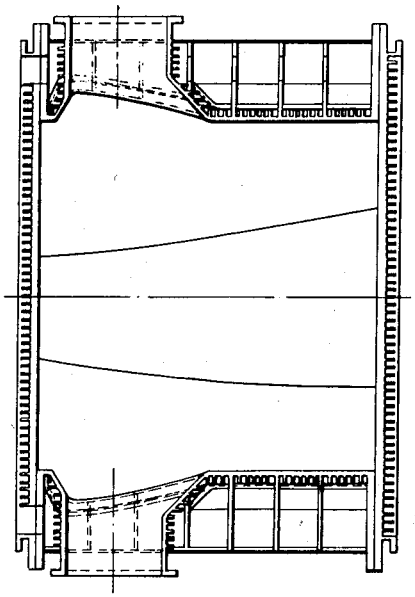
Figure 16:
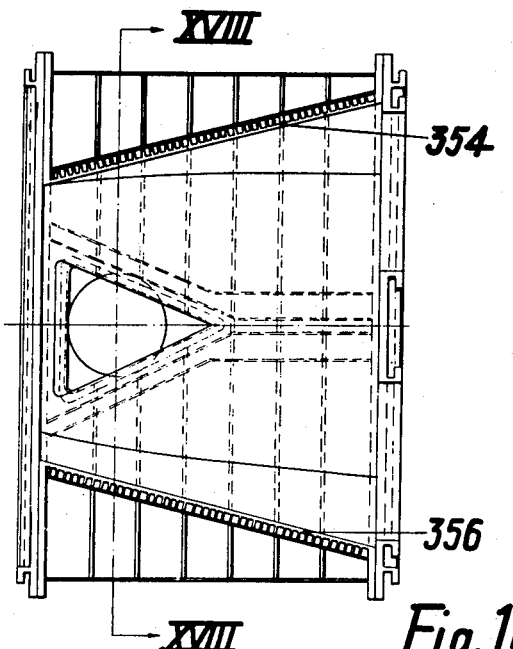
Figure 17:
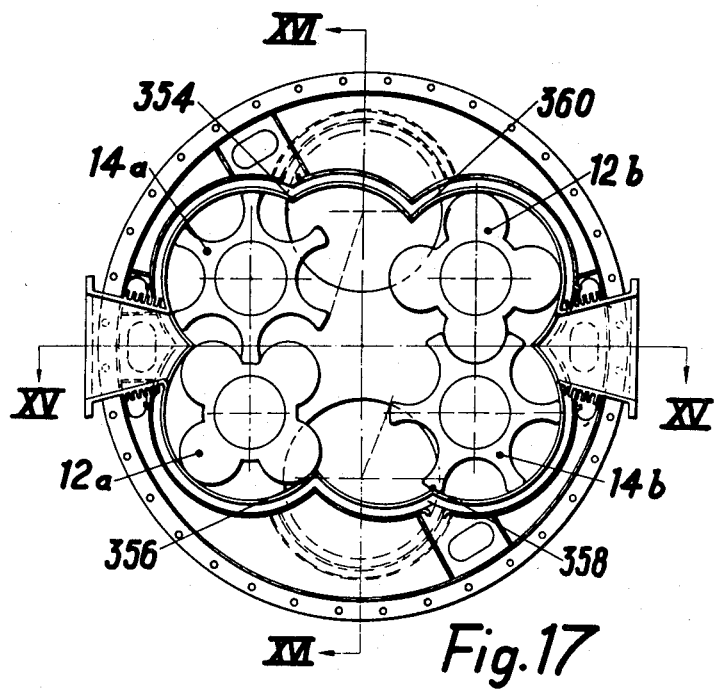

Figs. 15–17 show the modification that the edges of the inner mantle extending downwardly between the rotors are following the thread pitch of the screw cams in order to give an ideal construction of the outlet.

Figure 20:
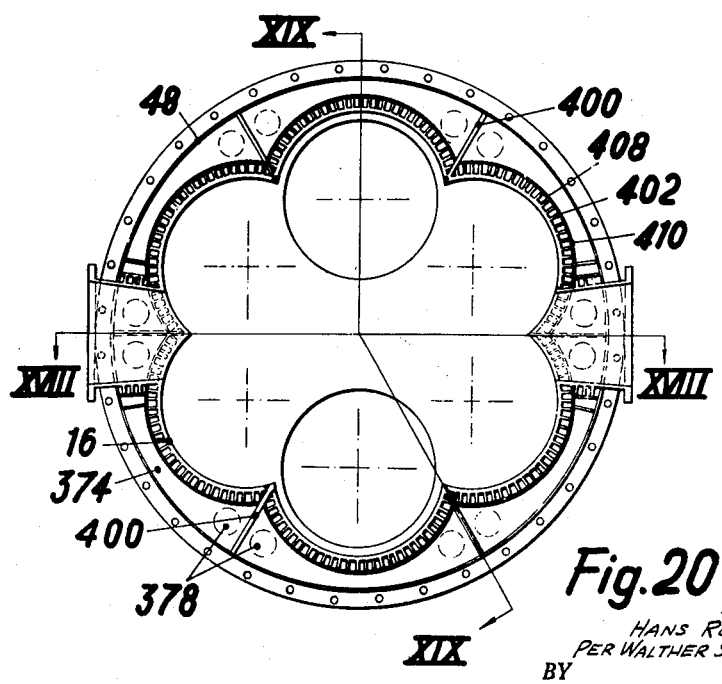
Figure 18:
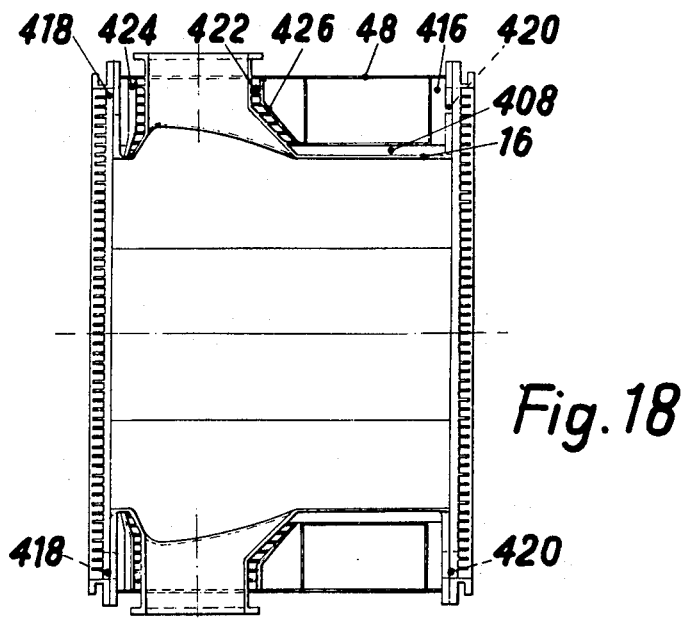
Figure 19:
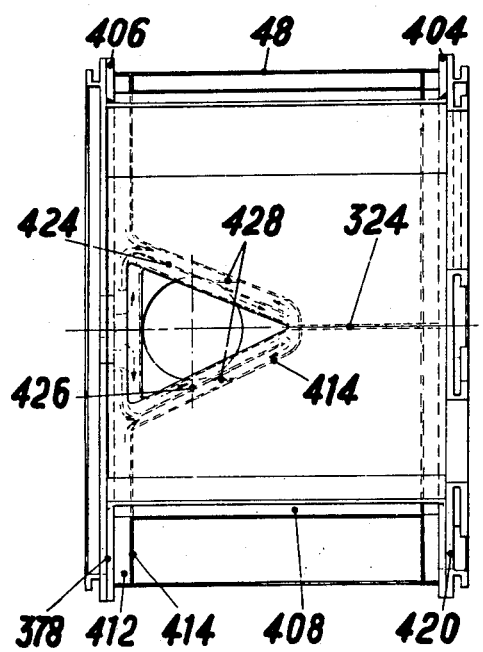

Figs. 18–20 give example of an alternative having the flanges axially directed instead of peripherically.

On the drawings, identical or equivalent details have been given the same reference characters in the different figures.

The displacement engine illustrated in Figs. 1–5 is preferably intended to work as a motor, for which reason the housing with gables as well as the rotors are constructed with effective cooling systems, in this special case for gaseous cooling medium. The engine housing 10, which is built in accordance with the principles of the invention, houses two rotors, i. e. the screw 12 and the slide 14, which are in the present case provided with helically wound lands and grooves engaging each other. Between the said rotor lands, the inside casing surfaces and end gables of the housing there will at the rotation of the rotors be formed volume varying working chambers for compression or expansion of compressive medium depending on the conditions under which the engine works. The inside wall of the inner jacket 16 of the housing 10 follows the outer contours of the rotors 12 and 14 with the smallest clearance permissible from an operative point of view, whereby two cylindrical grooves 18 and 20 are formed which are intersecting and further provided with an inlet port 22 and an outlet port 24 for supply, and discharge respectively of working medium. The cylinder grooves are covered by gable plates 26 and 28 through which holes are made for the rotor shafts which in the end jackets 30 and 32 rest in slide bearings 34, the rotor being held axially fixed by means of one axial bearing 36 for each of them. Labyrinth packings are provided at 38 for reducing the leakage outwardly from the working chamber of the engine. The piston rings 30 protect the bearings and prevent unnecessary losses of lubricating oil.

As the rotors are working with a clearance not only towards the encasing housing but also mutually, their shaft pivots are provided with each one cog wheel 42, and 44 respectively, at the inlet side, which engage each other and secure the position of the rotors relatively to each other. The mechanical power produced by the engine is utilized via an output shaft 46, which in fact is an extension of the one shaft pivot of the screw 12.

A more detailed description of the operating cycle and the construction of the engine type disclosed above, whether functioning as a compressor or as a motor, appears in U. S. Patent No. 2,627,161, granted February 3, 1955, on application Serial No. 289,161, filed as a continuation-in-part of application Serial No. 776,928 (abandoned in favor of the aforesaid application Serial No. 289,161) to which patent reference may be made in this respect.

The engine housing 10 proper is built up by the earlier mentioned inside wall 16, the end plates 26, 28, the end casings 30, 32, and a cylindrical outer jacket 48. The inner jacket 16 may be said to be built up of three housing surfaces cut from cylinders of appropriate diameter and material thickness, which have been united so as to form two intersecting cylindrical chambers 18 and 20—one for each rotor 12, and 14 respectively with inlet port 22 and outlet port 24 for the working medium—and further a collecting chamber 50 of expedient size for the exhaust gases. Externally the inner jacket 16 is provided with a series of peripherically extending flanges 52, which serve the double purpose of reinforcing the inner jacket and functioning as cooling flanges or alternatively as side walls for cooling ducts around the outer contour of same. In the embodiment shown, thin plates 54 are placed upon the flanges 52, whereby ducts 56 for cooling medium are formed.

The rotors 12 and 14 are to work with small clearances towards the walls of the grooves 18 and 20, for which reason it is of great importance that the housing construction and particularly the inside wall of the inner jacket maintains its shape unaltered, independent of variations in pressure and temperature. This object is reached through strong connection flanges 58 and 60 connecting onto the end jackets and also through a reinforcing flange 62 around the middle of the housing. These three flanges are preferably formed with circular periphery so that the outer jacket plate 48, placed on the outside of and secured to these flanges, can be made cylindrical, which is of course the most ideal from the point of view of resistance as well as of manufacture. This first-mentioned fact is of great importance when a light construction is needed, since the outer jacket, as is here the case, is stressed by an internal pressure rather considerably above atmospheric from the compressed cooling medium which flows between the two jackets 16 and 48.

Figure 1:
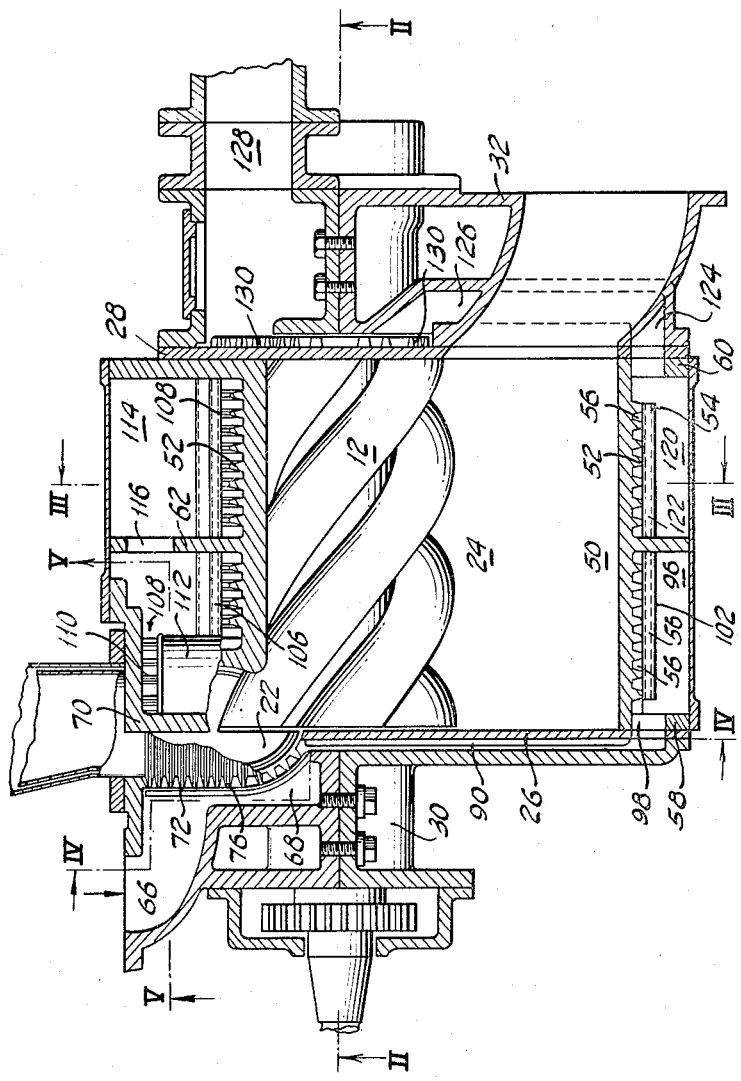
Figs. 1–5 show a displacement engine, the housing of which is constructed in accordance with the idea of the invention.
Figure 2:
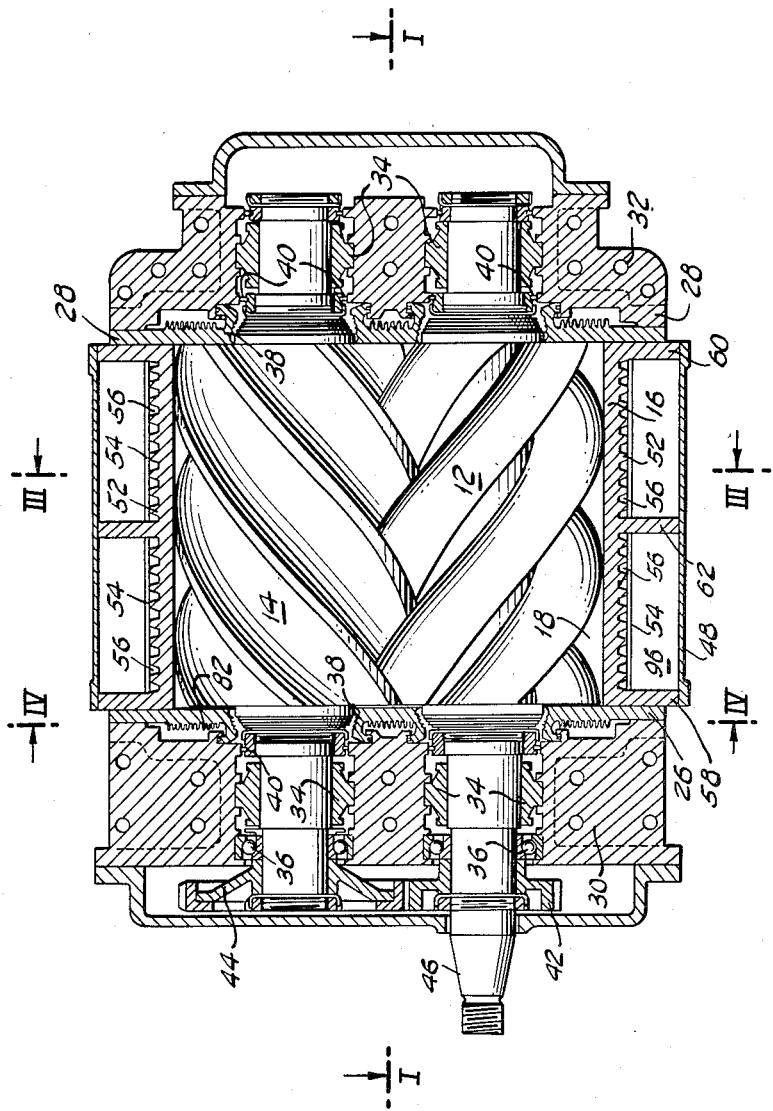
Figure 3:
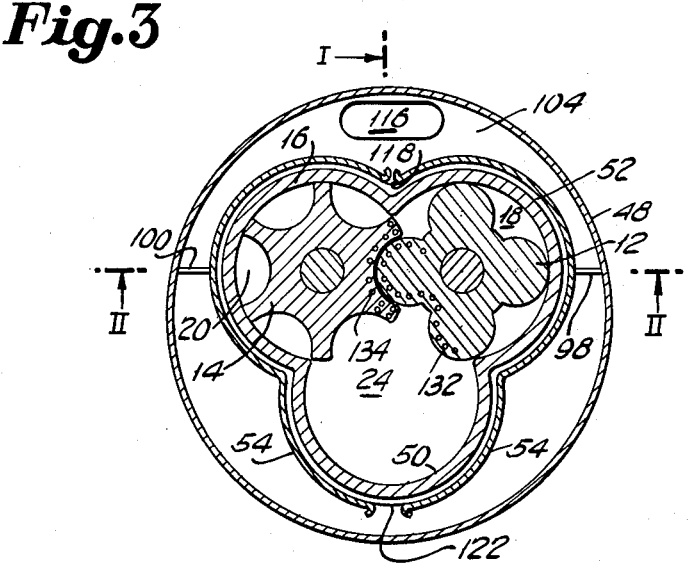
Figure 4:
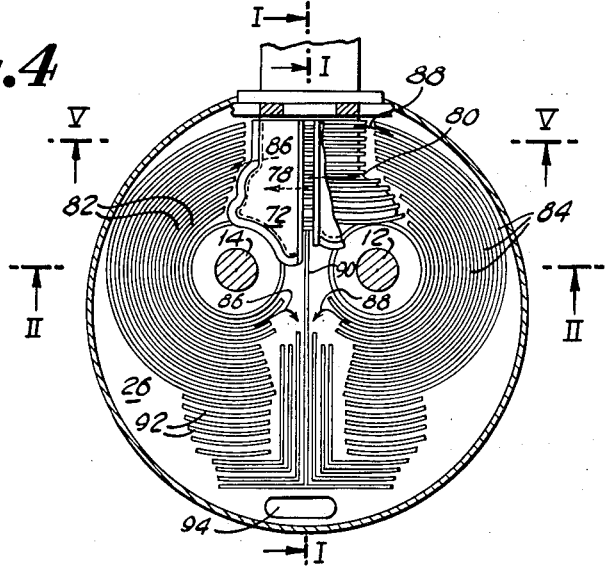
Figure 5:
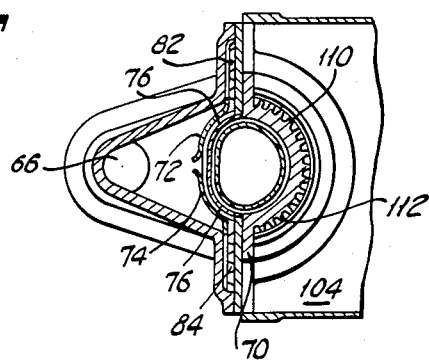

The two end plates 26 and 28 are made with thin walls and likewise provided with reinforcing and cooling flanges 82 and 84, so that effective cooling is obtained also with gaseous cooling media. As shown in Fig. 4, the flanges 84 are preferably formed as groups of concentric circular segments, which facilitates the working.

The engine type for which a housing according to the invention is particularly valuable works, as mentioned before, with very high temperatures of the driving medium, and the cooling of the material in the working surfaces therefore must be made particularly effective and, in order to give a high thermal efficiency, preferably be effected through the compressed medium which after being further heated for instance in a combustion chamber is supplied to the working chamber of the engine as motive fluid. Thus, the cooling of the engine housing 10 and particularly of the inner jacket 16 and the end plates 26, 28, is effected by means of compressed air which is first led in through a connection 66 to the chamber 68 in the end casing 30 for cooling the end plate 26 and the inlet stud 70 with its connection to the inlet port 22 for motive fluid. From the chamber 68 the cooling air is passed on along that portion of the inlet stud 70 which for practical reasons is welded onto the end plate 26 and along the said end plate 26. The air first flows in between two guide plates 72 and 74, the bent-up edges of which form an expedient inlet to the cooling ducts formed by the said guide plates and the flanges 76, in which cooling ducts the air flows to both sides in the direction of the arrows 78 and 80 and then passes forwards in the systems of cooling ducts formed between the flanges 82 and 84, arranged concentrically to the rotor shafts, and the inner surface of the end casing 30, which surface tightly contacts the flanges. The flow direction is indicated by the arrows 86 and 88. For cooling the portion between the rotor shafts there is also supplied a smaller quantity of air directly from the chamber 68 through small ports formed on opposite sides of a vertical flange 90, and the above mentioned guide plates 72 and 74. After having swept forwards along cooling flanges 92 provided in the bottom portion of the end plate 26, the cooling air is passed on to the cooling system of the housing proper through ports 94 connected to the chamber 96 which is formed between the connection flange 58, the reinforcing flange 62, the inner jacket 16 and the outer jacket 48 and the peripherically limiting walls 98 and 100. From this chamber, the air continues through the inflow port 102 extending along the guide plates 54 and into the cooling ducts 56 leading around the inner jacket 16, for finally being collected in the chamber 104 after having passed out of said cooling ducts either via the slot 106 between the opposite edges of the covering plates or via a slot 108 which partly involves the inlet stud 70. In order to obtain an effective cooling also of the inlet stud 70, this is provided with longitudinally extending flanges 110, on the outside of which there is placed a guide plate 112 having direct connection with the guide plates 54 of the inner jacket 16, whereby, as will easily be realized, part of the cooling air around the inside wall is forced to pass the cooling ducts of the inlet stud 70 before it through the slot 108 rejoins the other cooling air in the chamber 104. The cooling air is thereafter transmitted to a corresponding distributing chamber 114 in the other end of the housing through the aperture 116 in the reinforcing flange 62 and is in a way analogous to the one above-mentioned passed through the cooling duct 56 of the inner jacket 16 in the rear half of the housing body, the admission taking place through the slot 118 and the discharge to the chamber 120 in the lower portion of the housing construction through a similar slot 122.

In a manner corresponding to the one described for the front portion of the housing, a duct 124 leads the cooling medium from the chamber 120 to a collecting chamber 126. From there the cooling medium is led on out to the outlet 128 after having passed the cooling ducts 130' of the end plate 28, said ducts preferably being made in the way described for the end plate 26 of the inlet side. Besides, the flow direction will be opposite to that described for the end plate of the inlet side.

The rotors of this engine should likewise be cooled; and to this end the cams of the rotors are provided with longitudinally extending borings 132 and 134 as indicated in Fig. 4. Since neither the method of supplying cooling medium to the rotors nor the construction of the rotors has any essential influence on the devices according to the invention, the pertinent details have intentionally been omitted in specification and drawings, whereby the description has in other respects gained in clearness.

The housing construction illustrated in Figs. 6–8 shows the difference as compared to the one described above that the outer jacket 48 as well as the connection flanges 58, 60, and the reinforcing flanges 62 have no completely circular shape, but are given a shape somewhat differing from the ideal type because the outlet from the engine has been directed mainly radially outwards through the surface of the housing body, so that the housing can be said to consist of an externally cylindrical part cut by a plane which is preferably paralleling the rotor shafts.

As in Figs. 1–5, the housing 10 contains the inner jacket 16 which encases and constitutes the walls of the two mutually crossing rotor chambers 18 and 20 with inlet 22 and outlet 24 and which is reinforced by the connection flanges 58 and 60 and the reinforcing flange 62. A cylindrical casing 48 constitutes the outer jacket of the housing body, which is closed at the ends by the end plates 26 and 28 provided with cooling and reinforcing flanges, and furthermore by the end casings 30 and 32.

The path of the cooling air through the housing is illustrated by arrows. The supply is effected through the inlet port 66 in the end casing 30, wherefrom one part of the cooling air at first passes upwardly along the outer surface of the end plate, provided with cooling flanges, and along a part of the inlet for motive fluid to the engine. Through a series of apertures 200 the air is led on to a collecting chamber 202 between the end plate 26 and the end casing 30 and further via the duct 204 to the chamber 96 in the housing proper and mixes with the cooling air which has been led in directly through the duct 94. In a manner analogous to the one described in the foregoing embodiment the inlet side of the housing is cooled first, the air from the chamber 96 flowing forwards through the cooling ducts 56 of the inner jacket 16 and being collected in the upper chamber 104. From there the cooling air passes on through an aperture 116 in the reinforcing flange 62 to the upper chamber 114 at the other end of the housing construction, wherefrom the cooling air passes on through the rear cooling system of the inner jacket, upon which it is collected in the chamber 120 which communicates with the collecting chamber 126 in the end casing 32 of the outlet side. From there the cooling air is conducted along the cooling system of the end plate, formed between its cooling flanges 130 and the end casing 32. Thereupon the cooling air is discharged through the outlet 128.

The housing construction shown in Figs. 9–11 may be built solely of sheet metal and is, besides, an example of a particularly advantageous assembly of two engines of the type described above.

The inner jacket 16 consists of six similar, in section circle-segment-shaped parts, the edges of which extend along generatrices. Therefore it may advantageously be made of three cylinders of appropriate diameter, said cylinders being made of bent metal sheet, in which cooling and reinforcing flanges 52 have been turn out, whereupon the cylinders have been cut up along suitable generatrices. As appears from the cross-section in Fig. 11, two opposing pairs of these cylinder parts are disposed of by the rotors 12a and 14a, and 12b and 14b respectively, of the two engines, said rotors all having the same diameter on account of the desideratum to obtain a symmetrical inside wall. However, the further construction of the housing will not be notably different even if the engines should happen to be of different sizes or have different diameters of the rotors. Through placing the screw 12a in the lower and the screw 12b in the upper half of the housing there is furthermore obtained a mutual outlet to the collecting chamber 300 which is formed between the two engines and the cylinder segments 302, 304 connecting the grooves of same. In order to synchronize the engines, cog wheels may be provided on the shafts of rotors of same kind in the two engines, said cog wheels engaging an intermediate gear co-axial with the centre line of the housing. The exhaust gases are led off through two apertures 308 and 310 provided in one end wall 306. Motive fluid to the working chamber of the engines is supplied to the respective engine through the inlet studs 312 and 314 and through the triangular apertures 316 and 318 in the inner jacket 16. Straight across these studs there are mounted cooling flanges 320, between which cooling air is forced as will be described below.

The inner jacket 16 is encased by a cylindrical outer jacket 48 placed on the outside of externally circular reinforcing flanges 62, which are distributed appropriately spaced along the said inner jacket, guide plates 322, 324 and 328 being placed on the outside of the low cooling flanges 52, whereby series of cooling ducts 56 are formed around the inner jacket, which are in communication with two supply ducts 330a and 330b as well as with two discharge ducts 332a and 332b which besides being restricted by the guide plates 322, 324, 326 and the walls of the outer jacket 48 are also restricted by radial partitions 334 arranged in pairs and inserted between the reinforcing flanges 62, in which suitable apertures 336 have been provided. The feed ducts 330a and 330b communicate through inlet ports 338a and 338b in the front end wall 340 with the feed pipe for cooling medium to the engine housing, but for the matter of simplicity the end casings have been omitted and with them the connections made therein for the supply and discharge of cooling medium.

The path of the cooling medium from the inlet ports 338a and 338b respectively leads through the duct 330a and 330b respectively surrounding the inlet studs 312 and 314 respectively. As the medium flows forwards from one end of the ducts 330a and 330b to the other, it is fed down into the cooling ducts 56 of the inner jacket 16 through the slots 342a and 342b respectively on opposite sides of the studs 312 and 314 respectively as well as through their mutual extensions 344a and 344b respectively along the remaining wall of the housing, and is in both directions led over into the two discharge ducts 330a and 330b via the slots 346 and 346b which are provided between the guide plates 322, 328, and 324, 326 respectively. The cooling air is then led off from the engine housing through outlet ports 348 in the end plate 306. The direction of flow in the different ducts is indicated by arrows. The closed chambers 335 formed between the radial partitions 334, the guide plates 322, 324, 326 and 328 and the outer jackets 48 are through holes 337 in open communicating connection with the cooling duct systems for the purpose of pressure compensation.

An alternative embodiment of the cooling duct system around the inlet studs 312 and 314 is illustrated in the Figs. 12–14, which differs from the embodiment according to Figs. 9–11 mainly in that the cooling and reinforcing flanges 320 on the inlet studs 312, 314 for the working medium are drawn along instead of across the outer walls of the studs. Covering plates 350 on the outside of said flanges are at the bottom connected to the guide plates 322, 324, 326 and 328 of the inner jacket, but are provided with a slot 352 towards the outer jacket 48 at the top, through which slot cooling air can flow downwards along the wall of the inlet and then proceed in the cooling ducts 56 of the inner jacket 16. The holes 336, however, which are in this case circular, permit the greater part of the cooling air to pass on through the feed duct 330a for cooling the housing nearer the outlet end plate 306.

In the housing constructions previously described the opening edges along the rotors at the engine outlet have been parallel to the rotor shafts, through which the manufacture of the inner jacket is simplified since same may be built up of cylinder portions cut along generatrices.

Due to the construction such an outlet will not open all along the opening thread-edges simultaneously, which, on the other hand, will be the case if the inner jacket and particularly the edges at 354, 356, 358 and 360 limiting the outlet are designed as shown in Figs. 15–17. The said edges follow the screw pitch of the rotors so that the edge 354 follows the thread contour of the rotor 14a, the edge 356, the thread contour of the rotor 12a, the edge 358 the thread contour of the rotor 14b and the edge 360 the thread contour of the rotor 12b. Through this the casing surfaces between the edges 354 and 360 and between the edges 356 and 358 will be constituted by portions of conical casing surfaces instead of as described above by cylindrical ones. In other respects the construction of the housing is analogous to the embodiment according to Figs. 9–11.

In the embodiment according to Figs. 18–20 the reinforcing and cooling flanges 400 and 402 respectively of the inner jacket 16 are axially directed and secured to the end plate flanges 404 and 406 of the housing, preferably through welding. The outer edges of the flanges 402 are, however, following the contour of the inner jacket 16 also in this case, while the outer edges of the reinforcing flanges 400 are leaning against the inner wall of the cylindrical outer jacket 48. The same advantages are won also with this type of construction as are previously described for types already run through. The inner jacket 16 may be made thin and is at the same time cooled by a system of axially directed cooling ducts 408 which are formed between the said flanges 402 and the thin guide plates 410 placed on the outside of same. The cooling air is supplied to distribution chambers 412 formed between the reinforcing flanges 400, the other walls of said distribution chambers being formed by the end plate flange 406, parts of the inner jacket 16 and the outer jacket 48 as well as a partition 414. After having passed through the ducts 408, the air is collected again in a chamber 416 at the opposite end of the housing. Inlet ports and outlet ports 418 and 420 respectively admit, and discharge respectively, the cooling air from the said chambers.

The cooling of the inlet studs 312 and 314 is improved by the cooling flanges 422, between which the cooling air is forced on by guide plates 424 and 426, whereupon it is fed down into the cooling system of the inner jacket in the interspace between the walls 414, 424 and 428 where the guide plate 410 has been removed in order that necessary communication shall be effected. The position of the partition 428 is determined by the quantity of air to be distributed over the cooling system of the inlet studs 312.

We claim:

1. A housing structure for rotory devices of the kind having at least two intermeshing rotors with cylindrical envelopes and parallel axes, comprising an inner casing member having a wall providing cylindrical intersecting barrel portions with bores and axes corresponding with the envelopes and axes of the respective rotors, and an outer casing member around said inner casing member, the major portion of said outer casing member being constituted by a single cylindrical barrel portion encompassing at least the major portions of the barrel portions of said inner casing member and concentric with respect to an axis located in the region intermediate the axes of the intersecting barrel portions of said inner casing, connecting flanges extending outwardly from the ends of the barrel portions of said inner casing member for connecting the end portions of said casing members together, and one or more reenforcing flanges extending outwardly from the barrel portions of said inner casing member intermediate the ends thereof, said reenforcing flanges having circular peripheries aligned with the circular peripheries of said connecting flanges for engagement with the cylindrical portion of said outer casing member.

2. A structure as set forth in claim 1 in which said one or more reinforcing flanges extend transversely with respect to the axes of said barrel portions and have circular outer peripheries engaged by said outer housing member.

3. A structure as set forth in claim 1 in which said one or more reinforcing flanges extend axially with respect to said barrel portions.

4. A housing structure for rotary devices of the kind having at least two intermeshing rotors with cylindrical envelopes and parallel axes, comprising an inner casing member having a wall providing cylindrical intersecting barrel portions with bores and axes corresponding with the envelopes and axes of the respective rotors, and an outer casing member around said inner casing member, the major portion of said outer casing member being constituted by a single cylindrical barrel portion encompassing at least the major portions of the barrel portions of said inner casing member and concentric with respect to an axis located in the region intermediate the axes of the intersecting barrel portions of said inner casing, and connecting flanges extending outwardly from the ends of the barrel portions of said inner casing member for connecting the end portions of said casing members together.

5. A structure as set forth in claim 4 in which said inner casing provides two intersecting segmental barrel portions for housing the rotors and a third arcuate segmental portion connecting said barrel portions, said three portions being arranged substantially symmetrically with respect to a common axis constituting the axis of said cylindrically curved outer casing.

6. A structure as set forth in claim 4 in which said inner casing member comprises two intersecting segmental barrel portions and wall portions extending away from said barrel portions to form a port opening communicating radially with the bores of said barrel portions, and said outer casing comprises a cylindrical segment, the edge portions of which are connected with the last mentioned wall portions.

7. A structure as set forth in claim 4 in which said inner casing comprises a plurality of segmental arcuate sections providing a plurality of sets of intersecting barrel portions for the reception of a plurality of sets of intermeshing rotors, said sections being arranged generally symmetrically with respect to a common axis constituting the axis of the cylindrical outer casing.

8. A structure as set forth in claim 7 in which said arcuate sections intersect along lines parallel with said axis to provide a series of cylindrical segments.

9. A structure as set forth in claim 7 in which the sets of sections providing the barrel portions for the rotors intersect along lines parallel with said axis and the remaining sections intersect the sections providing the barrel portions along lines oblique to said axis, said remaining sections being in the form of conical segments.

10. A structure as set forth in claim 4 in which the walls of the barrel portions of the inner casing are provided with a plurality of outwardly projecting cooling flanges of substantially uniform height, and guide plate structure located between the inner and outer casing members and covering the channels formed between said cooling flanges to provide a plurality of channels for cooling fluid, there being openings in said guide plate structure providing communication between said channels and the space between said plate structure and said outer casing member.

11. A housing structure for rotary devices of the kind having at least two intermeshing rotors with cylindrical envelopes and parallel axes, comprising an inner casing member having a wall providing cylindrical intersecting barrel portions with bores and axes corresponding with the envelopes and axes of the respective rotors, and an outer casing member around said inner casing member, the major portion of said outer casing member being constituted by a single cylindrical barrel portion encompassing at least the major portions of the barrel portions of the inner casing member and concentric with respect to an axis located in the region intermediate the axes of the intersecting barrel portions of the inner casing member, connecting flanges extending outwardly from the ends of the barrel portions of said inner casing member for connecting said casing members together, and end plates secured to said connecting flanges for closing predetermined portions of the areas of the barrel portions of said inner casing member.

12. A structure as set forth in claim 11 including end members having bearings for supporting the rotors, said end members being recessed on the faces thereof adjacent to said end plates, said end plates being secured between said inner casing member and said end members, and said end plates being provided with cooling flanges projecting into said recesses to form passages for flow of cooling fluid over said end plates.

13. A structure as set forth in claim 12 in which communication is provided between the cooling passages provided on said end plate structure and the space between said inner and outer casing members whereby to permit flow of cooling fluid serially over one of said end plates, the barrel portions of the inner casing and the other of said end plates.

14. A structure as defined in claim 4 in which the axis of the cylindrical portion of said outer casing member is symmetrically located with respect to the axes of all of the rotor receiving barrel portions of said inner casing member.

References Cited in the file of this patent

UNITED STATES PATENTS

| | | |
|---|---|---|
| 584,067 | Wainwright | June 8, 1897 |
| 1,197,579 | Jackson | Sept. 5, 1916 |
| 1,315,234 | Needham | Sept. 9, 1919 |
| 1,386,792 | Needham | Aug. 9, 1921 |
| 1,851,193 | Laraque | Mar. 29, 1932 |
| 2,014,932 | Hallett | Sept. 17, 1935 |
| 2,062,045 | Van Deventer | Nov. 24, 1936 |
| 2,111,568 | Lysholm et al. | Mar. 22, 1938 |
| 2,287,716 | Whitfield | June 23, 1942 |
| 2,410,172 | Lysholm | Oct. 29, 1946 |
| 2,477,002 | Paget | July 26, 1949 |
| 2,504,841 | Jones | Apr. 18, 1950 |

FOREIGN PATENTS

| | | |
|---|---|---|
| 335,735 | Great Britain | Oct. 2, 1930 |
| 688,172 | France | May 6, 1930 |